Feb. 11, 1964  W. SCHROEDER  3,120,786
MILLING MACHINE KNEE AND SADDLE RETRACTION MECHANISM
Filed June 19, 1961  7 Sheets-Sheet 1

INVENTOR.
WALTER SCHROEDER
BY
Howard Keiser
John F. Verhoeven
ATTORNEYS

| MOVEMENT OF TABLE | SELECTOR VALVE LINES | | | | | | |
|---|---|---|---|---|---|---|---|
| | SOLENOID VALVE 162 | 163 | CROSS MOTOR 164 | 165 | VERTICAL MOTOR 166 | 167 | CLUTCH 168 | 169 |
| RAISE | | ▨ | | | | ▨ | ▨ | |
| LOWER | ▨ | | | | ▨ | | ▨ | |
| TO COLUMN | | ▨ | | ▨ | | | | ▨ |
| FROM COLUMN | ▨ | | ▨ | | | | | ▨ |
| NEUTRAL | | | | | | | ▨ | ▨ |

Fig. 16

United States Patent Office 3,120,786
Patented Feb. 11, 1964

3,120,786
MILLING MACHINE KNEE AND SADDLE
RETRACTION MECHANISM
Walter Schroeder, Cincinnati, Ohio, assignor to The Cincinnati Milling Machine Co., Cincinnati, Ohio, a corporation of Ohio
Filed June 19, 1961, Ser. No. 125,330
5 Claims. (Cl. 90—58)

This invention relates to a machine tool automatic cycle control mechanism and is particularly adapted for use in an automatic cycle milling machine.

Knee and column type milling machines are often used to machine parts on a production basis and therefore frequently fitted with automatic cycle control mechanisms. The conventional automatic cycle control mechanism provides for longitudinal movement of the table in accordance with a predetermined schedule. In such a cycle, if a single cycle starting position is used, the table and workpiece must be returned past the cutter to the starting position. Due to the forces during the cutting operation, the cutter and workpiece tend to spring apart slightly. After the cut, the forces vanish and the workpiece is moved a slight distance toward the cutter. Therefore, if the workpiece is returned directly to the starting position the cutter is caused to take a slight cut if rotating or to drag if stopped. If the cutter continues to rotate, the rate of return to the starting position is limited to prevent marring of the machined finish. If the cutter is stopped, the drag during return will mar the finish regardless of speed and will also dull the cutter. For these reasons, the usual practice is for the machine operator to manually retract the workpiece from the cutter by use of the hand control mechanism but this is not suitable for the machine equipped for automatic cycle since the time involved for the manual operation is unduly long. It is therefore advantageous to have a mechanism by which the table can be automatically retracted from the cutter for the return stroke which can then be entirely at the fastest possible rate. The mechanism must be accurate and return the table to the same cycle starting position each time to produce the same cutting cycle throughout a series of complete machine cycles.

It is, therefore, an object of the invention to provide a mechanism which may be combined in a knee and column milling machine to produce automatic advance and retraction strokes of the knee and saddle relative to the milling cutter.

It is a further object to provide an advance and retraction mechanism which gives accurate and repeatable movements of the machine table.

It is also an object to provide a mechanism which may be combined with the normal control mechanism of a knee and column machine without complication of and interference with normal manual and power feed control mechanisms.

Still another object is to provide a compact unit which may be applied in a knee and column machine without requiring a great amount of additional space.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A mechanism constructed in accordance with the preferred form of this invention utilizes the hand control shafts or crankshafts of a machine control station to provide a retraction and advance stroke mechanism. The knee and saddle hand crankshafts are each passed through a rotary vane or paddle type motor which may be operated by selective introduction of fluid under pressure to produce a fixed angular movement of the paddle members. Associated with each paddle motor is a clutch mechanism which is received between the paddle motor and the respective crankshaft. The clutches are operable by fluid under pressure to connect the paddle motors to their respective crankshafts and operation of each paddle motor produces a fixed amount of rotation of the crankshaft. The motors are reversibly operable, the angular stroke of each being equal in one and the other directions. The knee crankshaft is connected through gearing directly to the knee elevating mechanism, and the saddle crankshaft is connected directly to the cross feed mechanism. Thus, the increments of rotation imparted to the knee and saddle crankshafts produce corresponding increments of movement of the knee and saddle. Since the machine table is supported on the saddle which, in turn, is supported on the knee, the table may be raised and lowered relative to the base and moved toward and away from the machine column in accordance with the crankshaft rotations imparted by the paddle motors.

A clear understanding of the construction and operation of this invention can be obtained from the attached drawings in which:

FIG. 2 is a front elevation of a control box.

FIG. 9 is a schematic mechanical feed system.

Figures 1, 5, 6, 7, 17:
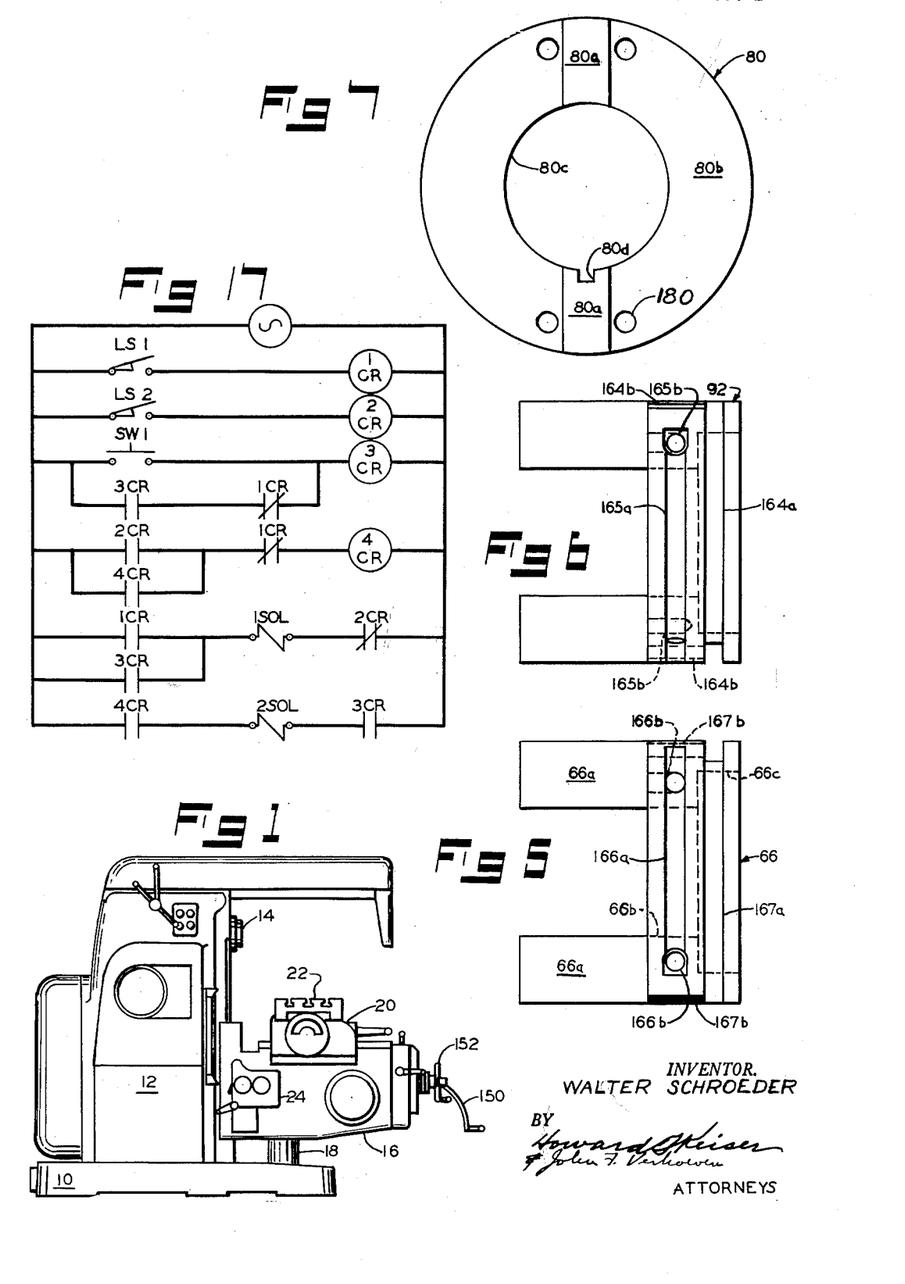
FIG. 1 is a side elevation of a knee and column milling machine.
FIG. 5 is a detail drawing of a paddle motor stationary vane member.
FIG. 6 is a detail drawing of a paddle motor stationary vane.
FIG. 7 is a detail drawing of a paddle motor rotary vane.
FIG. 17 is a simplified electrical control diagram.

A horizontal knee and column milling machine is shown in FIG. 1. The base 10 supports an upright column 12 in which the spindle 14, that holds and rotates a cutting tool (not shown), is journaled. A knee 16 extends from the front of the column 12 and is vertically movable by operation of a screw mechanism enclosed in the sleeve 18. A saddle 20 is received on top of the knee 16 and is movable toward and away from the column 12. A table 22 is supported on top of the saddle 20 and is longitudinally movable along an axis perpendicular to the direction of movement of the saddle 20 on the knee 16. A rear control station or box, indicated generally as 24, is equipped with the automatic retraction and advance mechanism of this invention to provide accurate increments of vertical movement of the knee 16 and cross movement of the saddle 20, thus providing vertical and cross movment of the table 22 on which the workpieces to be machined are supported.

An enlarged elevation view of the control box 24 is shown in FIG. 2. A pair of stationary dial collars, including a vertical movement dial collar 26 and cross movement dial collar 28, are provided on the front of the rear control box 24. A vertical control shaft 30 and a cross control shaft 32 extend through the vertical and cross dial collars 26, 28, respectively, and are rotatable relative thereto. A hand crank clutch bushing 34 is fixed to each of the control shafts or crankshafts 30, 32, and a dial member 36 is received over each of the bushings 34 for rotation therewith. The dials 36 are marked with reference index marks 37 (FIG. 3) to indicate against the collars 26, 28 for measurement of the amount of movement of the knee 16 and saddle 20. Also included on the control box 24 is a selector valve knob 38, the position of which relative to the index mark 39, determines the advance and retraction movement. The knob 38 may be positioned in three places; one producing retraction of the knee, one producing retraction of the saddle, and one producing no retraction movement. As shown, the selector knob 38 is in its center or neutral position, and no retraction or advance is selected. If the knob 38 is rotated approximately 90 degrees clockwise, vertical retraction is selected, and if it is rotated approximately 90 degrees counterclockwise from the position shown, cross retraction is selected. Other controls are provided at the rear control box 24. Lever 40 controls normal cross feed movement of the saddle 20. Lever 42 controls rapid traverse feed rate of the knee 16, saddle 20, and table 22. The knob 44 controls the automatic selection of speeds of longitudinal feed of the table 22 on the saddle 20. As shown in this enlarged side elevation of the control box 24 in FIG. 3, the control station 24 is attached to and extends from the side of the knee 16.

Figure 4:
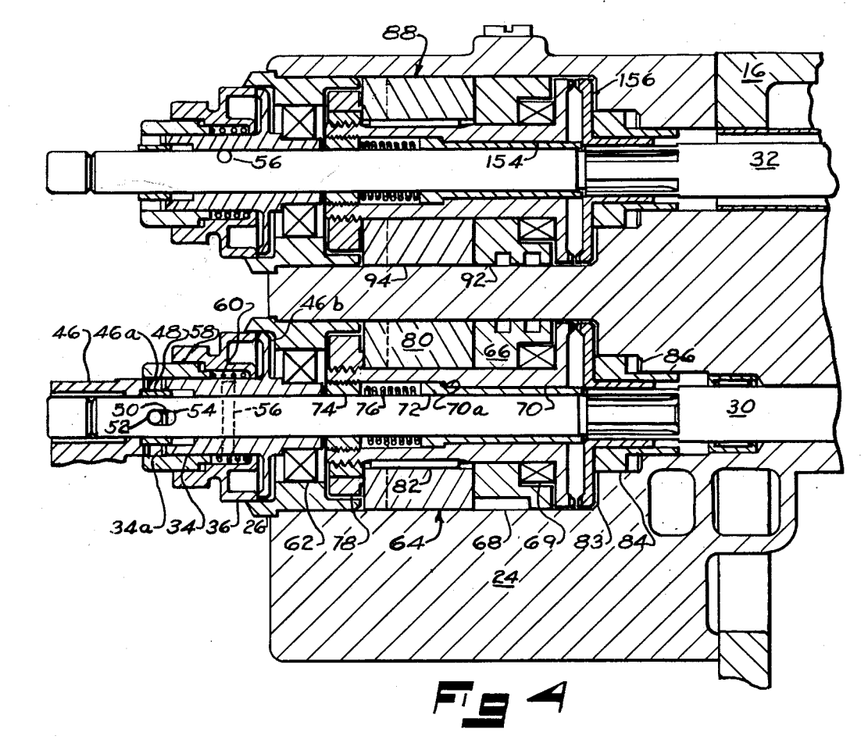
FIG. 4 is a section of FIG. 2 on line 4—4.
Figure 6:
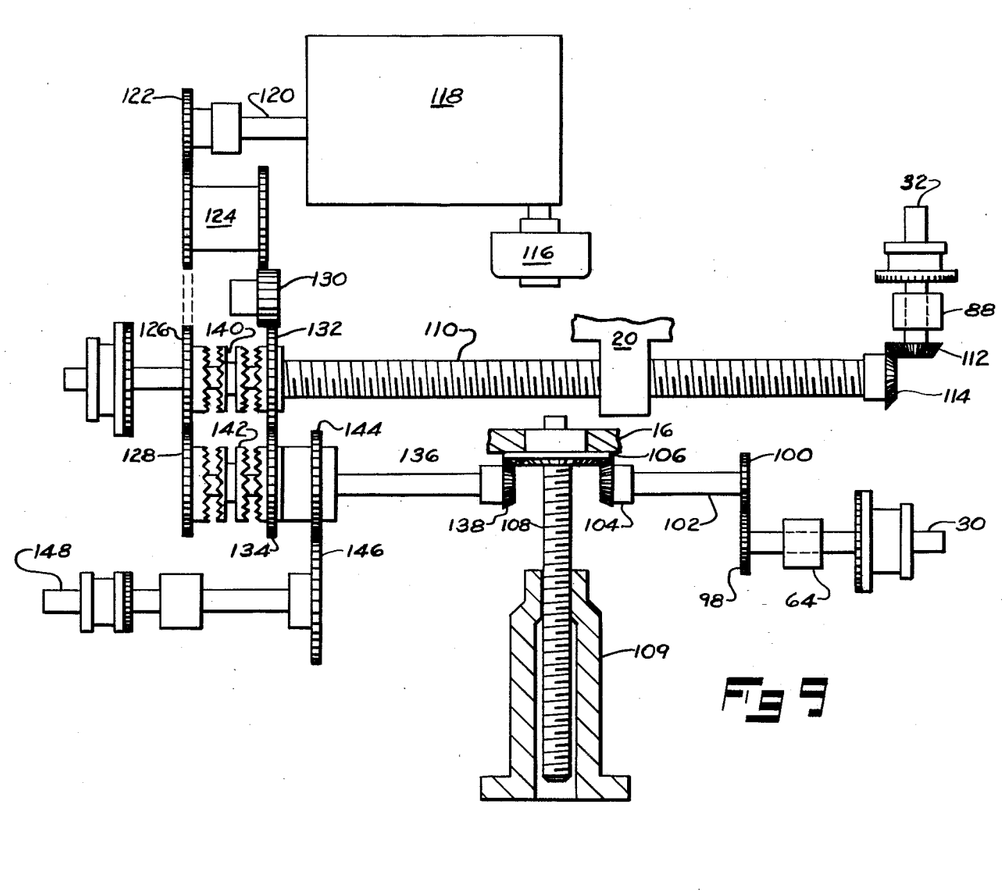

The sectional view in FIG. 4 shows the detail of retraction mechanism of this invention as it is incorporated in the control box 24. The cross and vertical crankshafts 30, 32 extend through the box 24 and into the knee 16. The crankshafts 30, 32 are similarly received in the control box 24, and the description of one will be given in detail. (The shaft 32 is shown rotated 90 degrees from the position of shaft 30.) The vertical crankshaft 30 extends from the control box 24, and its end is adapted to receive a removable hand crank 46. The crank 46 has a toothed clutch portion 46a which is adapted to engage a toothed clutch portion 34a of the clutch bushing 34 when the crank 46 is pushed in against the ring 48 received around the shaft 30. The ring 48 is axially movable on the shaft 30 a limited amount determined by the clearance hole 50 through the shaft 30 in which a pin 52 is received. The pin 52 is fixed in the ring 48 and is movable against a plunger rod 54 received inside the shaft 30 and biased against the pin 52 by a spring (not shown). Thus, the clutch portions 34a, 46a are held separated except when a force is applied to the crank 46 to overcome the force on the ring 48 created by the plunger rod 54. When the force of plunger rod 54 is overcome, the hand crank 46 is engaged with the clutch bushing 34, and the crank 46 may be used to rotate the bushing 34. The bushing 34 is fixed to the crankshaft 30 by a pin 56 and as the crank 46 rotates the bushing 34, the shaft 30 is rotated.

A collar 58 is fixed around the bushing 34 to hold a spring 60 in place. The spring 60 forces the dial member 36 against a flange 46b of the clutch bushing 46 to provide a positive drive from the bushing 46 to the dial 36. Thus the dial 36 normally rotates with the bushing 46 but by pulling the dial 36 against the spring 60, the machine operator may adjust the dial relative to the stationary dial collar 26 which is fixed in the control box 24. The bushing 34 is journaled in bearings 62 which are received inside the stationary collar 26.

Figure 3:
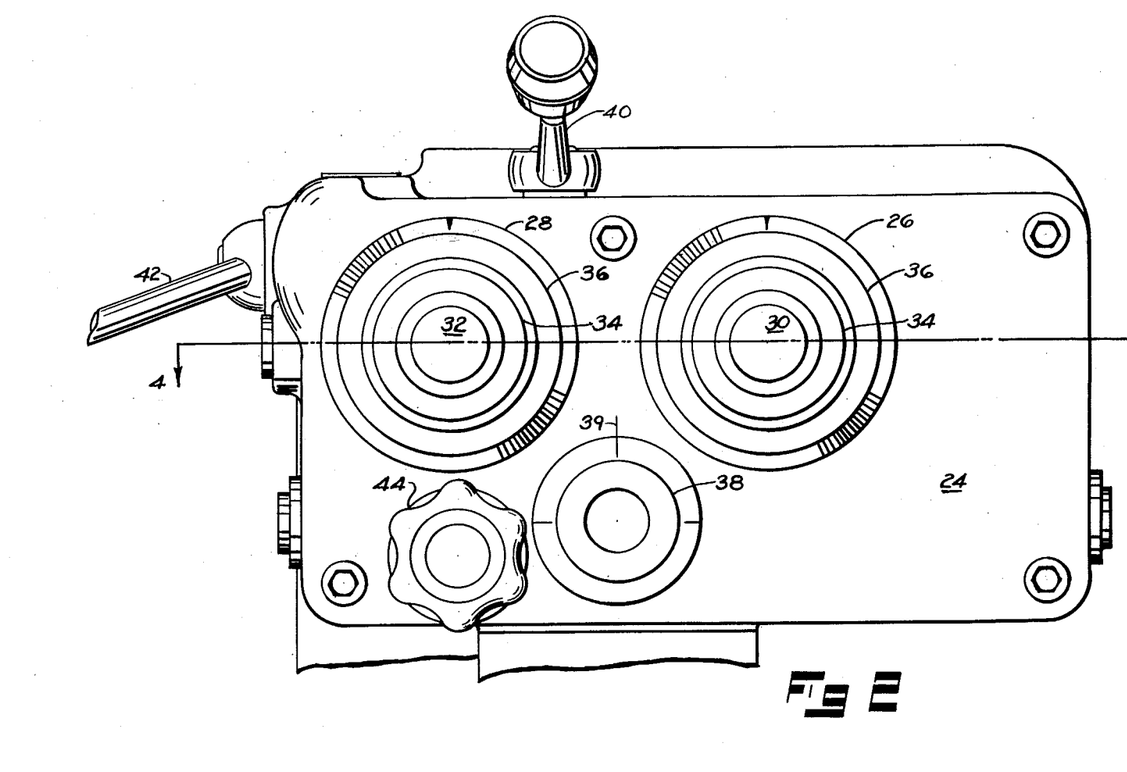
FIG. 3 is a side elevation of the control box of FIG. 2.

The vertical crankshaft 30 extends through the vertical retraction motor 64 (see FIG. 3). The motor 64 is a hydraulic vane motor which produces a fixed amount of rotary movement. The motor 64 is comprised basically of fixed vane or paddle portion 66 (FIG. 4), which is fixed in a motor cavity 68 in the control box 24. The stationary paddle portion may be seen in detail in FIGS. 5 and 8. It is basically a ring-shaped member having two paddles 66a extending longitudinally therefrom parallel to a bore 66b which extends through the member. A bearing recess 66c is formed in one end, and a bearing 69 (FIG. 4) is received therein. The stationary paddle portion 66 also has a machined form and interdrilling, to be described subsequently, which serve as fluid conduits in the motor 64.

A clutch member 70 is received through the bore 66b in the paddle member 66 and around the crankshaft 30. A plunger member 72 is received through the clutch member 70 and is movable on the crankshaft 30. A retaining nut 74 is threadedly received in one end of the clutch member 70, and a spring 76 is held between the retaining nut 74 and the plunger member 72 to force these two members apart. The plunger member 72 is forced against a shoulder 70a in the clutch member 70. The axial force produced on the clutch member 70 by the spring 76 is transmitted through the nut 74, clutch member 70, and the bearing 69 to the fixed paddle member 66. A second retaining nut 78 is threadedly received over the clutch member 70 and holds the movable paddle member 80 in place relative to the fixed member 66. The movable vane or paddle 80 of the same general shape as the fixed member 66 rotates within the cavity 68. The paddle 80 is shown in FIG. 7 to have a pair of paddle portions 80a of the same length and width as the paddle portions 66a of the stationary paddle member 66. The portions 80a extend from a ring portion 80b. The paddle 80 has a bore 80c through which the clutch member 70 is received. The paddle 80 has a longitudinal keyway 80d, and a key 82 is received therein to fix the paddle 80 (FIG. 4) to rotate with the clutch member 70. The dimensions of the paddle members 66 and 80 and the clutch member 70 are accurately produced and the parts fit very closely together when assembled. Clearance within the motor cavity 68 between the motor members fitted therein is very small. Thus, with selective introduction of fluid through the fixed paddle 66, the paddle portions 80a of the rotary paddle 80 may be swung within the cavity 68 from one side of the paddle portions 66a of the stationary member 66 to the other side of those paddle portions 66a.

A mating clutch member 83 is received on the crankshaft 30 and is in splined engagement therewith for limited axial movement. The plunger member 72 engages the clutch member 83 and holds it away from the clutch member 70 received through the paddle motor 64. A clutch plunger 84 is slidably received in a cavity 86 and around the clutch member 83. When fluid under pressure is introduced into the cavity 86, the clutch member 83 is forced to move toward and into engagement with the clutch member 70 by the hydraulic fluid in the cavity 86 which produces a force to overcome the force produced by the spring 76 on the plunger 72. Thus, the movable vane 80 is connected to the crankshaft 30 by the clutch members 70 and 83, and as the movable paddle 80 is rotated the crankshaft 30 is rotated.

The paddle motor 88 connected for rotation of the cross crankshaft 32 is constructed similar to the motor 64. The fixed paddle portion 92 of the motor 88 is shown in FIG. 6 and is similar to the fixed member 66 except for the machining and inter-drilling of the fluid passages therein as will appear in the description of operation to be set out later. The movable paddle member 94 of the motor 88 has pinned thereto a set of spacers 96 (FIG. 8) of general arcuate shape to increase the thickness of the paddle portions 94a and to limit the fixed rotary motion of the motor 88 to an amount less than that produced by the motor 64.

In FIG. 9 the mechanical linkages to the knee 16 and the saddle 20 are shown. The vertical crankshaft 30 with the vertical retraction motor 64 thereon is shown connected through gears 98, 100, shaft 102, gear 104, and bevel gear 106 fixed to the vertical screw 108. The bevel gear 106 is journaled in the knee 16, and, as it is rotated, the knee 16 is moved vertically with the screw 108, which is threadedly engaged with a pedestal 109 supported by the machine base 10 (FIG. 1) and enclosed in the sleeve 18. The gearing described is all located within the knee 16 and moves therewith.

The cross crankshaft 32, which extends through the cross retraction motor 88, is connected to the cross feed screw 110 through mating gears 112 and 114. The feed screw 110 is journaled for rotation in the knee 16, and the saddle 20 is threadedly engaged therewith. Consequently, as the shaft 32 is caused to rotate, the saddle 20 is moved along the feed screw 110 on the knee 16.

The knee 16 also houses the mechanism which produces the normal feed movements of the knee 16 and saddle 20. A feed motor 116 is connected to a set of change gears, indicated generally as the feed box 118. The feed box 118 contains gears shiftable in selected combinations to produce a range of speeds of the output shaft 120 and may be of any well known construction producing such a result. A gear 122 is fixed on the shaft 120 and drives a gear member 124 when shaft 120 is rotated. The gear member 124 drives two parallel gear trains. One train comprises gears 126 and 128 while the other train comprises gears 130, 132, 134. The gears 126 and 132 are journaled for rotation on the cross feed screw 110 while gears 128 and 134 are journaled on a vertical drive shaft 136 which is connected to the bevel gear 106 by a gear 138 fixed on the end thereof. A clutch member 140 is received between the gears 126 and 132 on the cross feed screw 110. The clutch member 140 is axially movable on the screw 110 but rotatable therewith. A shifting lever (not shown) is connected to the clutch member 140 and clutch 140 may be moved to engage either gear 126 or gear 132 from the neutral position shown to produce rotation of the cross feed screw 110. The direction of rotating of the screw 110 is determined by the gear with which the clutch member 140 is engaged since the gears 126 and 132 are counter-rotating due to a difference of one in the number of gears in the respective driving trains connected to those gears. A similar clutch member 142 is received between the gears 128 and 134 and is operable in the same manner as clutch member 140 to connect the shaft 136 for rotation by the feed box 118.

A gear 144 is fixed to the vertical drive shaft 136 and is engaged with a gear 146 fixed to the end of a front hand crankshaft 148. The shaft 148 extends from the front of the knee 16 where it is rotatable by means of a crank 150 (FIG. 1) to produce manually controlled vertical movement of the knee. The cross feed screw 110 extends from the front of the knee also and is rotatable by a handwheel 152 (FIG. 1) to produce manual cross feed movement of the saddle 20 on the knee 16.

Figure 8:
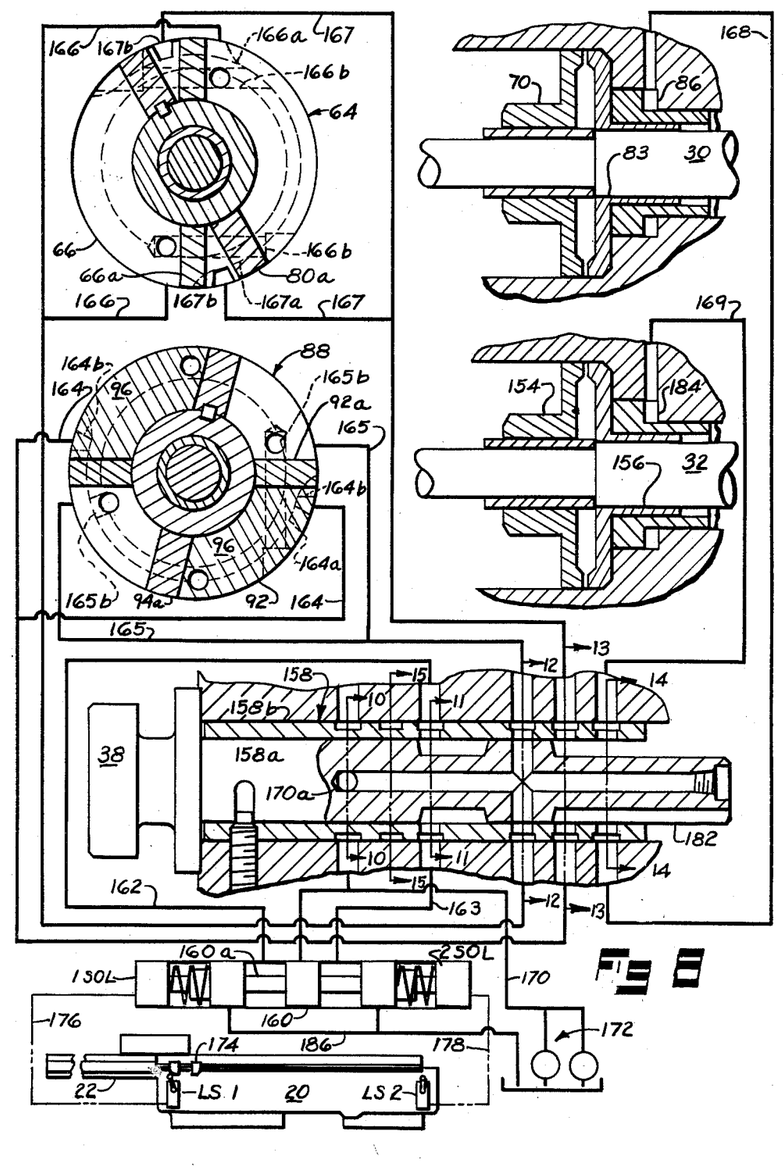
FIG. 8 is a schematic hydraulic circuit.

The hydraulic circuit for operation of the advance and retract mechanism of this invention is shown in FIG. 8. The vertical retraction motor 64 and the cross retraction motor 88 are shown with their connecting fluid lines 164, 165, 166, 167. The mating clutch members 70 and 83 and 154 and 156 (cross retraction clutch members) are also shown with the operating fluid lines 168 and 169 connected thereto. The selector valve 158 to which the selection knob 38 is connected for rotation to vertical, cross, and neutral positions is a distribution valve to which the fluid lines connecting with the retraction motors and clutches are connected. A solenoid valve 160, which controls fluid distribution during the machine cycle, is connected to the distribution valve 158 by fluid operating lines 162, and 163. The fluid under pressure is supplied to the system from line 170 which is connected to the distribution valve 158 and the solenoid valve 160 from a source of fluid under pressure 172. The table 22 is shown on the saddle 20 on which limit swtiches LS1 and LS2 are mounted. The limit switches are operated by dogs 174 on the table 22 as the table 22 is moved on the saddle 20. The limit switches LS1 and LS2 operate solenoids 1SOL and 2SOL respectively which, in turn, operate valve 160. Electrical connections between the limit switches LS1 and LS2 are shown representatively as broken lines 176 and 178.

Figures 10, 11:
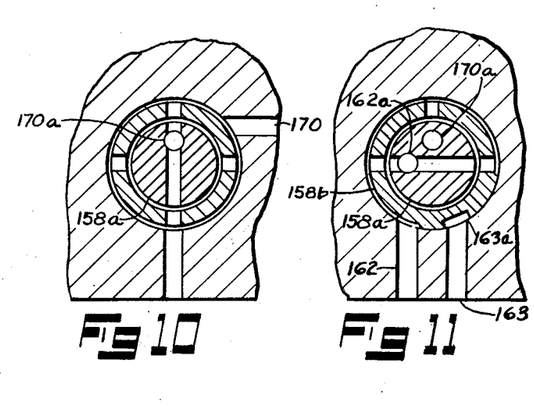
FIG. 10 is a detailed section of a selection valve in FIG. 8 on line 10—10.
FIG. 11 is a detailed section of the selection valve on line 11—11.
Figures 12, 13:
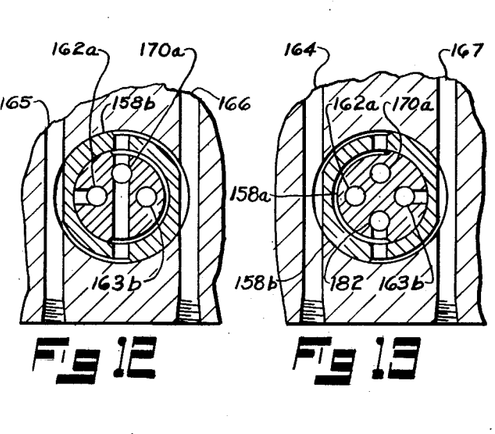
FIG. 12 is a detailed section of the selection valve on line 12—12.
FIG. 13 is a detailed section of the selection valve on line 13—13.
Figure 14:
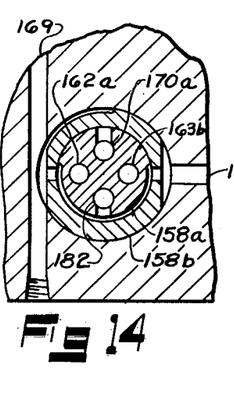
FIG. 14 is a detailed section of the selection valve on line 14—14.
Figure 15:
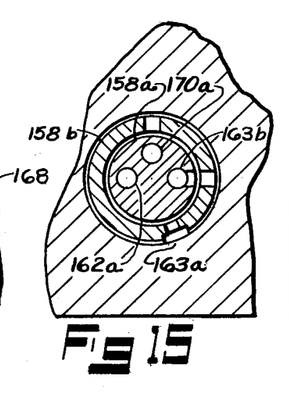
FIG. 15 is a detailed section of the selection valve on line 15—15.

In FIG. 8, the selector valve 158 is shown in simplified form with the interdrilling and channels therein shown out of position in some instances. With the selector valve 158 in the neutral position, the retraction motors 64 and 88 are not operated during the table cycle. FIGS. 10 through 15 show true sections of the valve 158 in the neutral position. In FIG. 10 the pressure line 170 connection to the interdrilled portion 170a of the valve spool 158a is shown. The interdrilled line 170a extends longitudinally in the spool 158a as shown in FIG. 8. The section in FIG. 11 shows that the operating line 162 is connected to a longitudinally extending interdrilled passage 162a in the spool 158a through channels in the sleeve 158b of the valve 158 while line 163 connects to a channel 163a on the sleeve 158b. In FIG. 15, the channel 163a is shown connected to a longitudinally extending interdrilled passage 163b. In FIG. 12 the lines 165 and 166 are shown connected through channels on the sleeve 158b to the interdrilled pressure line 170a. Thus, pressure is connected to both of the fluid lines 165 and 166 which are connected to the stationary paddle members 92 and 66, respectively. The paddle member 92 has a groove 165a (see FIG. 6) extending part way around its circumference to which interdrillings 165b are connected to form a fluid path into the motor 88 between the paddle members 92 and 94. The movable paddle 94 and the spacers 96 fixed thereto are swung to the position shown where the movable paddle is stopped with the spacer 96 against the stationary vanes 92a. The paddle member 80 in the motor 64 is likewise swung to the advanced position as shown in a similar manner. A groove 166a (see FIG. 5) extends part way around the circumference of the member 66 and is connected by interdrilled passages 166b to the chamber 68 (FIG. 4) to cause the movable paddle member 80 to swing to the position shown. The paddle member 80 is stopped by pins 180 (FIG. 7) extending from the paddle member 80 parallel to the vanes 80a to engage the stationary member vanes 66a.

The fluid on the other side of the movable vanes 66a and 94a of the motors 64 and 88 opposite the side to which lines 165 and 166 are in communication are open to lines 164 and 167, respectively through grooves 164a and 167a and channels 164b and 167b connecting therewith to the cavities 90 and 68, respectively. In FIG. 13, lines 164 and 167 are shown connected to the exhaust line 182 interdrilled in the spool 158a. Thus, the pressure differential created by the fluid lines 164, 165 and 166, 167 force both retraction motors to move to the advanced condition while the selector valve 158 is in the neutral position.

At this same time the clutch chambers 86 and 184 are connected to exhaust by fluid lines 168, 169 respectively. FIG. 14 shows that these lines are connected through grooves in the spool 158a and sleeve 158b to the exhaust line 182. Therefore, the plungers 84 force the clutch members 83 away from the clutch bushings 70 to disconnect the motors 64, 88 from the shafts 30, 32, respectively.

Assume now that the knob 38 (FIG. 2) is rotated 90 degrees clockwise to the vertical retract position and that the table 22 is in its starting position on the saddle 20. With the table 22 in the starting position, limit switch LS1 is engaged by a dog 174, and the solenoid 1SOL is energized to shift the plunger 160a of valve 160 to the right as viewed in FIG. 8. The valve line 163 is then connected through the valve 160 to a return line 186, while line 162 is connected to pressure line 170. As shown in FIG. 10, line 170 connects to passage 170a in any position of the valve spaool 158a. Fluid line 162 continues to connect with line 162a (FIG. 11) in the valve spool 158a as it does in all positions thereof. Fluid line 163 continues to connect with the passages 163a and 163b (FIG. 15) in all positions of the valve 158. Fluid line 165 is connected to pressure in passage 170a of the valve 158 (FIG. 12) when the knob 38 is in the vertical retract position in which the spool 158a is rotated 90 degrees clockwise from the position shown in FIGS. 10 through 15, and line 166 is connected to passage 162a which connects with line 162 (FIG. 11). Line 162 is connected to pressure lines 170 through the valve 160 when solenoid 1SOL is energized. Fluid line 167 is connected through the selector valve 158 to line 163b (FIG. 13). The passage 163b connects with the channel 163a (FIG. 15) which connects to the return line 186 by way of line 163 and valve 160. At the same time, line 164 is connected to the drain line 182 in valve 158 (FIG. 13). Pressure is connected directly to line 168 from passage 170a (FIG. 14) which connects with line 170 (FIG. 10) in valve 158, and line 169 is connected to the drain line 182.

The situation at the motors 64, 88 now is the same as in the neutral position of the selector valve 158 with pressure in lines 165 and 166 while lines 164 and 167 are return lines. Both motors 64, 88 are in the advanced position shown. At this time, however, pressure is also in line 168 to engage the vertical retraction clutch members 70 and 83 since pressure in the cavity 86 forces member 83 to the left, as viewed in FIG. 8, to engage the clutch member 70. Therefore, any rotation produced in the motor 64 will be transmitted to the shaft 30. The circuit continues to remain in the condition described until a table dog 174 engages limit switch LS2 after a predetermined amount of movement of the table 22 to the right as viewed in FIG. 8. It is during this time that the milling cut is taken on a workpiece.

When the limit switch LS2 is operated by the dog 174, the solenoid 1SOL is deenergized, and solenoid 2SOL is energized to shift the plunger 160a to the left to connect fluid line 163 to pressure and line 162 to the return line 186. Consequently, the line 167 is now connected to pressure while line 166 is connected to return, the position of the selector valve 158 remaining unchanged. The pressure differential in the motor 64 is reversed, and the movable paddle members 80a are caused to swing counter-clockwise from the position shown to produce an increment of motion of the shaft 30 which causes the vertical screw 108 (FIG. 9) to lower the knee 16 and therefore the table 22 away from the cutter held in the spindle 14 (FIG. 1). The table is now returned to the left (as viewed in FIG. 8) until the limit switch LS1 is operated by a table dog 174 to reverse the condition of solenoid valve 160 to reconnect fluid line 166 to pressure through line 162 and valve 160 and line 167 to return line 186 by way of valve 160. This is the end of a complete table cycle with the table in the same elevated position as at the start of the cycle.

Assume now that the selector valve knob 38 is rotated 90 degrees counterclockwise to the cross retraction position. Fluid line 165 is connected to fluid passage 162a (FIG. 12) and fluid line 166 is connected to pressure in passage 170. Fluid line 162 is connected to fluid passage 162a (FIG. 11). Fluid line 164 (FIG. 13) is connected to passage 163a, and line 167 is connected to exhaust line 182. Line 163 is connected to passage 163a (FIGS. 11, 15). Also, clutch line 169 is connected through selector valve 158 to pressure line 170 (FIG. 14) while clutch line 168 is connected to exhaust line 182.

With the table 22 (FIG. 8) in its starting position, solenoid 1SOL is energized, and the valve spool 160a is shifted to the right as in the vertical retract description. Consequently, pressure is connected to line 162 through valve 160 and line 163 is connected to the return line 186. Both retraction motors 64 and 88 are in the advanced condition shown, and since pressure is in line 169, the clutch members 154 and 156 are engaged with one another. At the end of the table stroke to the right, and upon engagement of limit switch LS2 by a table dog 174, the solenoid 1SOL is deenergized, and solenoid 2SOL is again energized. The lines 162 and 163 are reversed through valve 160 to connect with return line 186 and pressure line 170 respectively to reverse the pressure differential in the motor 88. Thus, the paddles 94a and spacer 96 are rotated clockwise until the movable paddles 94a engage the stationary paddles 92a. This causes an increment of rotation of the shaft 32 which causes the cross feed screw 110 (FIG. 9) to rotate and move the table 22 and saddle 20 away from the column 12 (FIG. 1). The table 22 is returned to the left (as viewed in FIG. 8) until limit switch LS1 is again operated by a dog 174 to energize solenoid 1SOL and deenergize solenoid 2SOL whereupon the valve 160 reverses condition. The pressure differential in the motor 88 is again as it was at the start of the cycle causing the motor 88 to return to the condition shown whereupon the saddle 20 and table 22 are returned to the advanced position toward the column 12.

Figure 16:
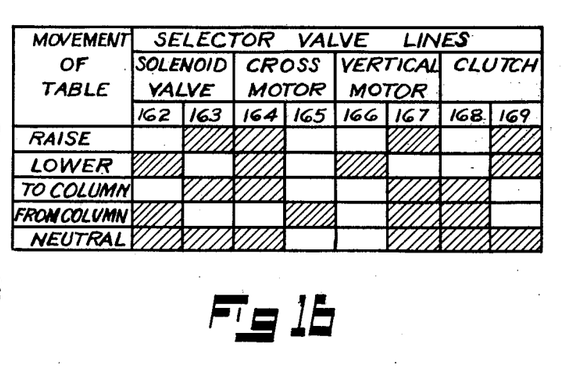
FIG. 16 is a table showing hydraulic circuit conditions.

In FIG. 16, the condition of the fluid operating lines 162 through 169 is shown in tabular form and summarizes the hydraulic circuit operation. Shaded areas represent exhaust or low pressure condition within the fluid lines while non-shaded areas represent fluid pressure in those lines. The table is arranged so that vertical columns represent the condition of a single line which is appropriately designated. The horizontal arrangement is by the machine cycle function. Thus, in the neutral condition of the hydraulic circuit when the retraction motors are not used, FIG. 16 shows lines 162 through 164 and 167 through 169 connected to exhaust while lines 165 and 166 are connected to pressure. The state of the circuit for the advance of the knee (labelled "raise") and retraction (labelled "lower") are easily determined from the table in FIG. 16 as are the conditions during saddle advance (labelled "to column") and retraction (labelled "from column").

A simplified electrical circuit for operation of the solenoids 1SOL and 2SOL during a machine cycle is shown in FIG. 17. With the machine table 22 (FIG. 8) in its starting position, limit switch LS1 is operated by a table dog 174, and relay 1CR is energized. Solenoid 1SOL is then energized through contacts of relays 1CR and 2CR (normally closed contacts). Consequently, the retraction motors are both advanced as described. The cycle start switch is closed, and relay 3CR is energized. Contacts of relay 3CR control other circuitry, not shown, in a conventional manner to initiate movement of table 22. As the table 22 begins to move, limit switch LS1 is released, but relay 3CR is latched through contacts of its own and normally closed contacts of relay 1CR which is deenergized when limit switch LS1 is released. Solenoid 1SOL remains energized through contacts of relay 3CR. At the end of the table stroke in one direction, a dog 174 operates limit switch LS2 and relay 2CR is energized. Solenoid 1SOL is immediately deenergized. At the same time, relay 4CR is energized through contacts of relays 2CR and 1CR (normally closed contacts) and as a result, solenoid 2SOL is energized through contacts of relays 4CR and 3CR. The solenoid valve 160 reverses position as described, and the selected retraction motor is caused to swing through its retraction stroke. Relay 4CR is latched through its own contacts to hold solenoid 2SOL energized during the return movement after limit switch LS2 is released. At the same time that the valve 160 reverses position, the table 22 reverses movement by means of conventional circuitry (not shown) and returns towards its starting position. When the table 22 arrives at its starting position, limit switch LS1 is operated, and relay 1CR is energized. Relays 3CR, 4CR and solenoid 2SOL are deenergized and solenoid 1SOL is energized to again reverse the valve 160 to cause advance movement of the table 22 by operation of the selected retraction motor. The table 22 is again in its starting position and ready for another cycle.

What is claimed is:

1. In a machine tool of the type having a slide moveable on a supporting member by operation of a feed motor connected to the slide, a slide retraction mechanism comprising, a reversible rotary retraction motor having a fixed angular stroke when operated, a control shaft received through said retraction motor and rotatable relative thereto, means to connect said shaft to the slide for movement thereof when said shaft is rotated, a clutch mechanism operable when energized to connect said retraction motor to said shaft, and means selectively to energize said clutch mechanism and to operate said retraction motor to effect a predetermined movement of the slide independent of movement by the feed motor.

2. In a machine tool of the type having a slide movable on a supporting member by operation of a feed motor connected to the slide, a slide retraction mechanism comprising, a reversible rotary hydraulic retraction motor having a fixed angular stroke when operated, a control shaft received through said retraction motor and rotatable relative thereto, means to connect said shaft to the slide for movement thereof when said shaft is rotated, a fluid pressure actuated clutch received between said retraction motor and said shaft and operable to connect said shaft to said retraction motor for rotation thereby, and control means selectively to connect fluid under pressure to said retraction motor and said clutch to effect a predetermined movement of the slide independent of movement by the feed motor.

3. In a milling machine of the type having a column, a knee vertically movable on the column, a saddle movable toward and away from the column on the knee, a table longitudinally movable on the saddle, and a feed motor selectively connectable for feed movement of the knee, saddle, and table, a retraction mechanism comprising, a knee retraction motor having a fixed angular stroke when operated, a knee control shaft extending through said knee retraction motor and rotatable relative thereto, means to connect said knee control shaft to the knee for movement thereof when said knee control shaft is rotated, a saddle retraction motor having a fixed angular stroke when operated, a saddle control shaft extending through said saddle retraction motor and rotatable relative thereto, means to connect said saddle control shaft to said saddle for movement thereof when said saddle control shaft is rotated, coupling means energizable to connect said knee retraction motor for rotation of said knee control shaft, coupling means energizable to connect said saddle retraction motor for rotation of said saddle control shaft, means selectively to energize said coupling means and to operate said retraction motors to effect predetermined advance and retraction movements of the table by movement of the knee and saddle independent of movement by said feed motor.

4. In a milling machine of the type having a column, a knee vertically movable on said column, a saddle movable toward and away from said column on said knee, a table longitudinally movable on said saddle, and a feed motor selectively connectable for feed movement of the knee, saddle, and table, a retraction mechanism comprising, a rotary hydraulic knee retraction motor having a fixed angular stroke when selectively connected to fluid under pressure, a knee control shaft received through said knee retraction motor and rotatable relative thereto, means to connect said knee control shaft to the knee for movement when said knee control shaft is rotated, a fluid pressure actuated clutch received between said knee retraction motor and control shaft to connect said knee control shaft to said knee retraction motor for rotation thereby, a rotary hydraulic saddle retraction motor having a fixed angular stroke when selectively connected to fluid under pressure, a saddle control shaft received through said saddle retraction motor and rotatable relative thereto, means to connect said saddle control shaft to the saddle for movement thereof when said saddle control shaft is rotated, a fluid pressure actuated clutch received between said saddle retraction motor and control shaft to connect said saddle control shaft to said saddle retraction motor for rotation thereby, and means selectively to connect fluid under pressure to said clutches and retraction motors for effecting predetermined advance and retraction movements of the table by movement of the knee and saddle independent of movement by said feed motor.

5. In a milling machine of the type having a column, a knee vertically movable on the column, a saddle movable toward and away from the column on the knee, a table longitudinally movable on the saddle, and a feed motor selectively connectable for feed movement of the knee, saddle, and table, a retraction mechanism comprising, a rotatable hydraulic knee retraction motor having a fixed angular stroke when operated, a knee control shaft received through said knee retraction motor and rotatable relative thereto, means to connect said knee control shaft to the knee for movement thereof when said knee control shaft is rotated, a fluid pressure actuated knee clutch received between said knee control shaft and knee retraction motor to connect said knee control shaft to said knee retraction motor for rotation thereby, a rotary hydraulic saddle retraction motor having a fixed angular stroke when operated, a saddle control shaft received through said saddle retraction motor and rotatable relative thereto, means to connect said saddle control shaft to the saddle for movement thereof when said saddle control shaft is rotated, a fluid pressure actuated saddle clutch received between said saddle retraction motor and control shaft to connect said saddle retraction motor for rotation thereby, a selector valve adjustable to neutral, vertical and cross positions, said selector valve connecting fluid under pressure to said knee clutch in the vertical position and to said saddle clutch in the cross position, and means selectively to connect fluid under pressure to said retraction motors for operation thereof, said knee retraction motor reversibly operable when said selector valve is in the vertical position and said saddle retraction motor reversibly operable when said selector valve is in the cross position.

References Cited in the file of this patent
UNITED STATES PATENTS

| | | |
|---|---|---|
| 1,891,356 | Parsons | Dec. 20, 1932 |
| 1,905,382 | Hoppe | Apr. 25, 1933 |
| 2,903,933 | Mackenizie | Sept. 15, 1959 |